United States Patent [19]
Rao et al.

[11] 4,049,881
[45] Sept. 20, 1977

[54] SOLID ELECTROLYTE COMPOSITION AND CELL

[75] Inventors: Bhaskara M. L. Rao, Fanwood; Bernard G. Silbernagel, Scotch Plains, both of N.J.

[73] Assignee: Exxon Research & Engineering Co., Linden, N.J.

[21] Appl. No.: 760,341

[22] Filed: Jan. 18, 1977

[51] Int. Cl.$^2$ ............................................. H01M 10/44
[52] U.S. Cl. ....................................... 429/50; 429/191
[58] Field of Search ................. 429/191, 50; 252/62.2, 252/62.3; 423/463–465, 476, 600

[56] References Cited

U.S. PATENT DOCUMENTS 3,824,130  7/1974  Liang ................................ 429/191 X Primary Examiner—C. F. Lefevour
Attorney, Agent, or Firm—Kenneth P. Glynn

[57] ABSTRACT

Novel solid electrolyte compositions and novel electrochemical cells utilizing the novel electrolyte compositions are disclosed. The cells utilize: (a) an anode which contains as the anode-active material an alkali metal; (b) a cathode which contains as the cathode-active material a chalcogenide of the empirical formula $M'A_p$ wherein $M'$ is one or more metals selected from the group consisting of titanium, zirconium, hafnium, niobium, tantalum and vanadium, A is one or more chalcogens selected from the group consisting of oxygen, sulfur, selenium and tellurium, and $p$ is a numerical value between about 1.8 and about 3.2; and (c) a novel solid electrolyte composition which comprises one or more lithium-halogen-aluminum sulfate compounds of the formula LiI. $x[Al_2(SO_4)_3 \cdot nH_2O]$ wherein $x$ is a numerical value representing the number of moles of $Al_2(SO_4)_3 \cdot nH_2O$ per mole of LiI, and wherein $n$ is a numerical value representing the number of moles of $H_2O$ per mole of $Al_2(SO_4)_3$, i.e., the extent of hydration of the compound.

25 Claims, No Drawings

SOLID ELECTROLYTE COMPOSITION AND CELL

BACKGROUND OF THE INVENTION

1. Field of the Invention

This invention relates to novel solid electrolyte compositions and to electric current producing cells containing these compositions. More particularly, this invention relates to solid electrolyte compositions and to improvements in the electric current producing cells of the type comprising an alkali metal anode, a solid electrolyte, and a cathode having metal chalcogenide cathode-active material.

2. Description of the Prior Art

There has been considerable interest in recent years in developing high energy density batteries or voltaic cells. Among the systems being investigated are those employing nonaqueous liquid and fused electrolytes, light-weight metals, such as alkali metals, as anodes, and cathodes containing chalcogenide compounds, particularly transition metal chalcogenide compounds (see, for example, U.S. Pat. Nos. 3,925,098, 3,864,167 and 3,791,867).

Additionally, various efforts have been made to develop solid state electrolytes for electrochemical cell systems. Alkali metal-aluminum-halogen compounds have been utilized in liquid and molten state electrolyte systems (e.g. as described in U.S. Pat. No. 3,877,984 and U.S. Pat. No. 3,751,298) and solid alkali metal-aluminum-halogen compound conductivity studies have been made (for example, N. I. Anufrieva et al, *Tseut. Metal.*, Vol. 1, pp 32–36 (1973); W. Weppner et al, *Physics Letters,* Vol. 58A, No. 4, pp 245-248(1976); and J. Schoonman et al, *J. Solid State Chem.*, Vol. 16, pp 413-422 (1976)). Additionally, solid electrolytes containing mixtures of lithium sulfate and lithium halides have been proposed (see U.S. Pat. No. 3,506,490, for example). However, to date, there has been no suggestion that the lithium aluminum sulfate-containing compounds of the type employed in the present invention might be useful as solid state electrolytes or that they may be used in electrochemical cells having alkali metal anodes and chalcogenide cathodes.

SUMMARY OF THE INVENTION

The novel solid electrolyte composition of the present invention comprises one or more compounds of the formula LiI·x[Al$_2$(SO$_4$)$_3$·nH$_2$O] wherein $x$ is the number of moles of Al$_2$(SO$_4$)$_3$·nH$_2$O and $n$ is the number of moles of H$_2$O per mole of Al$_2$(SO$_4$)$_3$. The novel electric current-producing cell of the present invention contains: (a) an alkali-metal containing anode; (b) a cathode having metal chalcogenide cathode-active material; and (c) the solid electrolyte described above.

DETAILED DESCRIPTION OF THE INVENTION

The novel electrolyte composition of the present invention is a solid electrolyte which comprises one or more compounds of the formula:

$$\text{LiI·}x[\text{Al}_2(\text{SO}_4)_3\cdot n\text{H}_2\text{O}] \tag{1}$$

wherein $x$ is a numerical value representing the number of moles of Al$_2$(SO$_4$)$_3$·nH$_2$O per mole of LiI, and wherein $n$ is the number of moles of H$_2$O per mole of Al$_2$(SO$_4$)$_3$, i.e., the extent of hydration of the compound.

The variable $x$ in Formula (1) is generally within the range of about 0.05 to about 5, and is preferably about 0.5 to about 2. Most preferred are the compounds in which $x$ is approximately 1. The variable $n$ is generally a value from 0 to about 20 and is desirably 0 to about 10. Advantageously $n$ may be 0 or may be in the range of about 4 to about 8. Thus, the Formula (1) compounds include the anhydrous as well as the hydrated embodiments. Preferably, $n$ may be in the range of about 5 to about 6.

The electrolyte compounds of Formula (1) above may be prepared by reacting powdered lithium iodide with powdered aluminum sulfate. The aluminum sulfate may be anhydrous, partially hydrated or hydrated. The mixture of powders is reacted by the application of heat. Typically elevated temperatures as high as 400° F or higher, e.g., 400° F to 600° F, may be used and the reaction may be completed to an acceptable degree in a short period of time, e.g., a few minutes to 1 or 2 hours, although this may vary depending upon the relative amounts of reactants employed and the particular reaction temperature which is chosen. The compound obtained may be used by itself or in combination with known solid electrolyte compounds which are compatible with it, e.g., LiI, and/or may contain known binders or other inert materials which do not have a detrimental effect on the electrolytic capabilities of the compound(s). In a peferred embodiment, one or more compounds of Formula (1) above are utilized alone as the electrolyte.

The solid electrolyte is subsequently formed into the desired shape by molding, pressing, rolling, and/or binding with polymeric compounds which do not detrimentally affect the electrolytic activity of the electrolyte, as mentioned.

The novel electric current-producing cell of the present invention is a solid state cell which contains an anode, a cathode and the solid electrolyte described above. By "solid state" cell is meant a cell from which electric current may be drawn at temperatures below the melting point of the electrolyte The anode employed in the cell of the present invention is one which contains alkali metal as its active material. Desirably, the anode is substantially sodium, potassium, lithium or alloys containing these, and preferably the anode is lithium metal or an alloy of lithium. The anode, e.g., lithium, may be in contact with other metal structures, e.g., nickel, copper or silver screen, which serve as current collectors and are well known in the art.

The cathode used in the cell of the present invention is one which contains as its cathode-active material one or more chalcogenide compounds of the empirical formula:

$$M'A_p \tag{2}$$

wherein M' is one or more metals selected from the group consisting of titanium, zirconium, hafnium, niobium, tantalum and vanadium; A is one or more chalcogens selected from the group consisting of oxygen, sulfur, selenium and tellurium, and $p$ is a numerical value between about 1.8 and about 3.2. Advantageously, M' is titanium in Formula (2) and the titanium dichalcogenides are desirable. Also A in Formula (2) is advantageously sulfur. Thus, the metal sulfides are particularly useful. In the most preferred embodiments, M' is titanium and A is sulfur. Desirably, $p$ is a numerical value between about 1.8 and about 2.1, and preferably between about 1.95 and about 2.02.

The chalcogenides which are used as the cathode-active material may be any of the compounds within the scope of Formula (2) above. Among these are $TiS_2$, $ZrS_2$, $HfS_2$, $NbSe_3$, $TaS_2$, $TaSe_3$, $TaO_{2.5}$ (or $Ta_2O_5$), $VSe_2$, $VO_{2.5}$ (or $V_2O_5$) and the like. Vanadium disulfide is not known but theoretically it should possess a structure of the type found in the other disclosed dichalcogenides and should be similarly electrochemically active. Disulfides of vanadium in combination with other transition metals, such as $V_{0.25}Ti_{0.75}S_{2.0}$, display the requisite electrochemical activity, as do vanadium diselenide and vanadium ditelluride.

The cathode-active material used in the cathode of the cell of the present invention is preferably an intercalatable compound. It should be noted that intercalated dichalcogenides are such in the discharged state, and that, in the charged state, the intercalatable chalcogenide contains no intercalated species.

The cathode structure itself need not necessarily consist of the cathode-active material alone but may be a structure such as carbon, nickel, stainless steel, aluminum, etc., upon which the dichalcogenide is deposited. Preferably, the cathode structure consists entirely of the dichalcogenide. The cathode-active material is typically a good electronic conductor and may thus often serve as its own current collector. The cathode-active material may be admixed or diluted with a minor amount of any other electrochemically active material, and alloys (i.e., solid solutions) of the individual chalcogenides may be used as well as the individual chalcogenides. The cathode may be readily fabricated from the individual or alloyed chalcogenides using materials and methods well known in the prior art, e.g., polytetrafluoroethylene bonding agents or support structures such as nickel or copper mesh.

The electrolyte employed in the cell of the present invention is, as mentioned, the novel solid electrolyte composition described above. It is included in the cell in any of the many configurations and arrangements which are well known in the solid electrolyte cell art.

The present invention is illustrated by the following examples, but the invention should not be construed as being limited thereto:

EXAMPLE 1

A solid state electrolyte compound having the formula $LiI \cdot Al_2(SO_4)_3$ was prepared by reacting premixed powders of LiI and $Al_2(SO_4)_3$ in a one-to-one mole ratio by the application of heat. The mixture was heated for about 1 to 2 hours in the temperature range of 450° F to 550° F. The mobility of the compound was examined by alternating current conductivity and NMR techniques. The resulting data is shown in Table I, below.

EXAMPLE 2

A solid state electrolyte compound having the formula $LiI \cdot Al_2(SO_4)_3 \cdot nH_2O$ in which $n$ was penta- to hexa-prepared in accordance with the procedure of Example 1 except that a penta- to hexa-hydrate aluminum sulfate starting material was used. Conductivity test results are shown in Table I and are comparable to those of the Example 1 electrolyte compound. The observed ambient temperature (25° C) conductivity was found to be $3 \times 10^{-6} (\Omega\text{-cm})^{-1}$, more than 30 times that of LiI itself and comparable to the best conductivities of non-ceramic Li salts such as $LiI + Al_2O_3$, for which the conductivity is approximately 5 to $10 \times 10^{-6} (\Omega\text{-cm})^{-1}$. Activation energies determined from conductivity and NMR observations were found to be approximately 7 kcal/mole, appreciably lower than typical values for many Li salts (e.g., about 10 kcal/mole). Additionally, the NMR studies revealed than an appreciable fraction (e.g., as much as about 50%) of the lithium ions are moving at room temperature, further establishing these materials as exceptional electrolytes

EXAMPLE 3 and 4

Additional electrolyte compounds were prepared in accordance with the procedure of Example 1 for Examples 3 and 4, having the following formulas respectively:

Example 3 — $LiI \cdot 0.11 Al_2(SO_4)_3 \cdot 5.5 H_2O$

Example 4 — $LiI \cdot 0.5\ Al_2(SO_4)_3 \cdot 5.5 H_2O$

Conductivity test results are shown in Table I, illustrating the advantageous properties of these compounds.

EXAMPLE 5

Functioning cells of $Li/LiI \cdot Al_2(SO_4)_3 \cdot nH_2O/TiS_2$ (where $n = 5$ to 6) were assembled in a single cell configuration. The cell assembly consisted of thick electrolyte pellets having a diameter of about 0.5 in. and a thickness of about 0.03 to 0.035 in., pressed at about 12,000 to 15,000 psi and lithium foils and $TiS_2$ pellets. The electrolyte pellets were sandwiched between lithium foils having a diameter of about 0.4 in. and a thickness of about 0.01 in. and $TiS_2$ pellets having a diameter of about 0.5 in. and a thickness of about 0.02 in. These single cells assembled in this manner had open circuit voltages of about 2.73 volts at room temperature and delivered short circuit currents of about 5 to 15 $\mu A/cm^2$. At 200° C, the single cells delivered about 2 $mA/cm^2$ at 2 volts and short circuit currents of about 20 $mA/cm^2$.

EXAMPLE 6

The cells of Example 5 were stacked in two multicell bipolar configurations, one having four cells and the other having 20 cells. Open circuit voltages were measured at room temperature and found to be 11.72 volts and 55.7 volts for the 2 configurations respectively.

TABLE I
CONDUCTIVY VS. TEMPERATURE FOR $LiI \cdot x [Al_2(SO_4)_3 \cdot nH_2O]$ ELECTROLYTE COMPOUNDS

| Temperature (° F) | Specific Conductivity (ohm-cm)$^{-1}$ | | | |
|---|---|---|---|---|
| | Example 1 | Example 2 | Example 3 | Example 4 |
| 260 | $9.37 \times 10^{-5}$ | $8.14 \times 10^{-5}$ | $9.87 \times 10^{-6}$ | $1.04 \times 10^{-6}$ |
| 280 | $1.54 \times 10^{-4}$ | $1.28 \times 10^{-4}$ | $1.17 \times 10^{-5}$ | $1.57 \times 10^{-6}$ |
| 300 | $2.83 \times 10^{-4}$ | $1.68 \times 10^{-4}$ | $3.94 \times 10^{-5}$ | $2.51 \times 10^{-6}$ |
| 320 | $4.56 \times 10^{-4}$ | $1.29 \times 10^{-4}$ | $4.78 \times 10^{-5}$ | $5.69 \times 10^{-6}$ |
| 340 | $6.43 \times 10^{-4}$ | $7.73 \times 10^{-4}$ | $9.87 \times 10^{-5}$ | $8.36 \times 10^{-6}$ |
| 400 | $9.83 \times 10^{-4}$ | $9.66 \times 10^{-4}$ | $1.85 \times 10^{-4}$ | $1.28 \times 10^{-5}$ |

What is claimed is:

1. A solid electrolyte composition, comprising one or more compounds of the formula:

$LiI \cdot x] Al_2(SO_4)_3 \cdot nH_2O]$ wherein $x$ is the number of moles of $Al_2(SO_4)_3 \cdot nH_2O$ per mole of LiI, and wherein $n$ is the number of moles of $H_2O$ per mole of $Al_2(SO_4)_3$, subject to the proviso that $x$ is a numerical value from about 0.05 to about 5, and $n$ is a numerical value from 0 to about 20.

2. The solid electrolyte composition of claim 1 wherein $x$ is a numerical value from about 0.5 to about 2.

3. The solid electrolyte composition of claim 2 wherein $n$ is a numerical value from 0 to about 10.

4. The solid electrolyte composition of claim 3 wherein $n$ is a numerical value from about 4 to about 8.

5. The solid electrolyte composition of claim 3 wherein $n$ is 0.

6. The solid electrolyte composition of claim 4 wherein $x$ is approximately 1.

7. The solid electrolyte composition of claim 6 wherein $n$ is a numerical value from about 5 to about 6.

8. The solid electrolyte composition of claim 5 wherein $x$ is approximately 1.

9. An electric current-producing cell, comprising:
   a. an alkali metal-containing anode;
   b. a cathode containing as its cathode-active material, one or more chalcogenides of the empirical formula:

$$M'A_p$$

wherein M' is one or more metals selected from the group consisting of titanium, zirconium, hafnium, niobium, tantalum and vanadium, wherein A is one or more chalcogens selected from the group consisting of oxygen, sulfur, selenium and tellurium, and wherein $p$ is a numerical value between about 1.8 and about 3.2; and
   c. a solid electrolyte comprising one or more compounds of the formula:

$$LiI \cdot x[Al_2(SO_4)_3 \cdot nH_2O]$$

wherein $x$ is the number of moles of $Al_2(SO_4)_3 \cdot nH_2O$ per mole of LiI, and wherein $n$ is the number of moles of $H_2O$ per mole of $Al_2(SO_4)_3$, subject to the proviso that $x$ is a numerical value from about 0.05 to about 5, and $n$ is a numerical value from 0 to about 20.

10. The cell of claim 9 wherein the anode is substantially sodium, lithium, potassium or alloys containing these and wherein $x$ is a numerical value from about 0.05 to about 5.

11. The cell of claim 9 wherein M' is titanium and wherein $n$ is 0 or is a numerical value from about 4 to about 8.

12. The cell of claim 9 wherein $n$ is a numerical value from about 5 to about 6.

13. The cell of claim 10 wherein A is sulfur and wherein $n$ is a numerical value from 0 to about 10.

14. The cell of claim 11 wherein A is sulfur.

15. The cell of claim 14 wherein the anode is substantially lithium or a lithium alloy and wherein $x$ is approximately 1.

16. An electric current-producing cell, comprising:
   a. a lithium metal-containing anode;
   b. a cathode containing titanium disulfide as the cathode-active material; and
   c. a solid electrolyte comprising one or more compounds of the formula:

$$LiI \cdot x[Al_2(SO_4)_3 \cdot nH_2O]$$

wherein $x$ is the number of moles of $Al_2(SO_4)_3 \cdot nH_2O$ per mole of LiI, and wherein $n$ is the number of moles of $H_2O$ per mole of $Al_2(SO_4)_3$, subject to the proviso that $x$ is a numerical value from about 0.05 to about 5, and $n$ is a numerical value from 0 to about 20.

17. The cell of claim 16 wherein $n$ is a numerical value from about 4 to about 8 and $x$ is approximately 1.

18. The cell of claim 16 wherein the electrolyte is anhydrous and the $x$ is approximately 1.

19. A method of operating an electric current-producing cell, comprising:
   drawing a current from the cell at a temperature below the melting point of the electrolyte of the cell, wherein the cell contains:
     a. an alkali metal-containing anode;
     b. a cathode containing as its cathode active material, one or more chalcogenides of the empirical formula $$M'A_p$$

wherein M' is one or more metals selected from the group consisting of titanium, zirconium, hafnium, niobium, tantalum and vanadium, wherein A is one or more chalcogens selected from the group consisting of oxygen, sulfur, selenium and tellurium, and wherein $p$ is a numerical value between about 1.8 and about 3.2; and
     c. a solid electrolyte comprising one or more compounds of the formula:

$$LiI \cdot x[Al_2(SO_4)_3 \cdot nH_2O]$$

wherein $x$ is the number of moles of $Al_2(SO_4)_3 \cdot nH_2O$ per mole of LiI, and wherein $n$ is the number of moles of $H_2O$ per mole of $Al_2(SO_4)_3$, subject to the proviso that $x$ is a numerical value from about 0.05 to about 5, and $n$ is a numerical value from 0 to about 20.

20. The method of claim 19 wherein the anode is substantially sodium, lithium, potassium or alloys containing these and wherein $x$ is a numerical value from about 0.05 to about 5.

21. The method of claim 19 wherein M' is titanium and wherein n is 0 or is a numerical value from about 4 to about 8.

22. The method of claim 19 wherein $n$ is a numerical value from about 5 to about 6.

23. The method of claim 20 wherein A is sulfur and wherein $n$ is a numerical value from 0 to about 10.

24. The method of claim 20 wherein A is sulfur.

25. The method of claim 23 wherein the anode is substantially lithium or a lithium alloy and wherein $x$ is approximately 1.

* * * * *

UNITED STATES PATENT OFFICE
CERTIFICATE OF CORRECTION

Patent No. 4,049,881        Dated Sept. 20, 1977

Inventor(s) Bhaskara M. L. Rao and Bernard G. Silbernagel

It is certified that error appears in the above-identified patent and that said Letters Patent are hereby corrected as shown below:

Abstract, line 15; Col. 1, line 49; Col. 4, line 49; Claim 1, line 3; Claim 9, line 15; and Claim 19, line 20, the formula in each occurrence should read as follows:

$$LiI \cdot x[Al_2(SO_4)_3 \cdot nH_2O]$$

Abstract, line 17, the formula should read: $(SO_4)_3 \cdot nH_2O$

Signed and Sealed this

Twenty-seventh Day of December 1977

[SEAL]

Attest:

RUTH C. MASON
Attesting Officer

LUTRELLE F. PARKER
Acting Commissioner of Patents and Trademarks